(12) United States Patent
Diamond

(10) Patent No.: US 11,975,612 B2
(45) Date of Patent: May 7, 2024

(54) TORQUE CONTROL FOR A HYBRID OR ELECTRIC VEHICLE

(71) Applicant: FORD GLOBAL TECHNOLOGIES, LLC, Dearborn, MI (US)

(72) Inventor: Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 17/032,456

(22) Filed: Sep. 25, 2020

(65) Prior Publication Data

US 2022/0097529 A1 Mar. 31, 2022

(51) Int. Cl.
| | | |
|---|---|---|
| *B60L 15/10* | (2006.01) | |
| *B60C 11/24* | (2006.01) | |
| *B60K 1/02* | (2006.01) | |
| *B60L 3/10* | (2006.01) | |
| *B60L 15/20* | (2006.01) | |

(52) U.S. Cl.
CPC .......... *B60L 15/10* (2013.01); *B60C 11/246* (2013.01); *B60K 1/02* (2013.01); *B60L 3/106* (2013.01); *B60L 15/2036* (2013.01)

(58) Field of Classification Search
CPC ........ B60L 15/10; B60L 3/106; B60C 11/246; B60K 1/02
USPC .......................................................... 701/22
See application file for complete search history.

(56) References Cited

U.S. PATENT DOCUMENTS

| | | | |
|---|---|---|---|
| 9,481,243 B2* | 11/2016 | Larkin | B60K 23/08 |
| 2014/0365046 A1 | 12/2014 | Madsen | |
| 2015/0251659 A1* | 9/2015 | Fischer | B60T 8/171 382/104 |
| 2018/0261899 A1 | 9/2018 | Milton et al. | |
| 2019/0161064 A1* | 5/2019 | Zdych | B60W 40/064 |
| 2019/0161077 A1* | 5/2019 | Watanabe | B60W 30/045 |
| 2019/0337391 A1 | 11/2019 | Crombez et al. | |
| 2020/0307606 A1* | 10/2020 | Lellmann | B60W 40/064 |
| 2022/0144257 A1* | 5/2022 | Maeda | B60W 10/20 |
| 2023/0175232 A1* | 6/2023 | Verho | E02F 9/2253 172/2 |

* cited by examiner

*Primary Examiner* — Jacob S. Scott
*Assistant Examiner* — Michael E Butler
(74) *Attorney, Agent, or Firm* — David B Kelley; Brooks Kushman P.C.

(57) ABSTRACT

A vehicle includes a first wheel, a second wheel, and a controller. The first and second of wheels have first and second tires, respectively. The controller is programmed to receive inputs indicative of tire tread wear of the first and second wheels. The controller is further programmed to, in response to a command to adjust torques of the first and second wheels to first and second desired torque values, respectively, and a difference between a tire tread wear of the first wheel and a tire tread wear of the second wheel exceeding a threshold, adjust the torque of the first electric machine to less than the first desired torque value and adjust the torque of the second electric machine to greater than the second desired torque value.

17 Claims, 2 Drawing Sheets

TORQUE CONTROL FOR A HYBRID OR ELECTRIC VEHICLE

TECHNICAL FIELD

The present disclosure relates to powertrain systems for hybrid or electric vehicles.

BACKGROUND

Hybrid and electric vehicles include powertrain systems that are configured to transfer torque and power from one or more powerplants (e.g., an engine or an electric machine) to the wheels of the vehicle.

SUMMARY

A vehicle includes a plurality of wheel hubs, a plurality of wheels, a plurality of electric machines, and a controller. Each wheel includes a tire and is secured to one of the wheel hubs. Each electric machine is secured to one of the wheel hubs and is configured to transfer torque to one of the wheels. The controller is programmed to receive inputs indicative of tire tread wear of each wheel. The controller is further programmed to, in response to a command to adjust torques of each of the electric machines to corresponding desired torque values and a difference between a tire tread wear of a first of the wheels and a tire tread wear of a second of the wheels exceeding a threshold, adjust the torque of a first of the electric machines, which is configured to transfer torque to the first of the wheels, to less than the corresponding desired torque value being commanded to the first of the electric machines and adjust the torque of a second of the electric machines, which is configured to transfer torque to the second of the wheels, to greater than the corresponding desired torque value being commanded to the second of the electric machines.

A vehicle includes a first pair of wheels, a second pair of wheels, a first electric machine, a second electric machine, and a controller. The first pair of wheels has a first pair of tires. The second pair of wheels has a second pair of tires. The first electric machine is configured to transfer torque to at least one of the wheels of the first pair of wheels. The second electric machine is configured to transfer torque to at least one of the wheels of the second pair of wheels. The controller is programmed to receive inputs indicative of tire tread wear of the first and second pairs of wheels. The controller is further programmed to, in response to a command to adjust torques of the first and second electric machines to first and second desired torque values, respectively, and a difference between a tire tread wear of one of the wheels of the first pair of wheels and a tire tread wear of one of the wheels of the second pair of the wheels being less than a threshold, adjust the torque of the first electric machine to the first desired torque value and adjust the torque of the second electric machine to the second desired torque value. The controller is further programmed to, in response to the command to adjust the torques of the first and second electric machines to the first and second desired torque values, respectively, and the difference between the tire tread wear of one of wheels of the first pair of wheels and the tire tread wear of one of wheels of the second pair of the wheels exceeding the threshold, adjust the torque of the first electric machine to less than the first desired torque value and adjust the torque of the second electric machine to greater than the second desired torque value.

A vehicle includes a first wheel, a second wheel, and a controller. The first and second of wheels have first and second tires, respectively. The controller is programmed to receive inputs indicative of tire tread wear of the first and second wheels. The controller is further programmed to, in response to a command to adjust torques of the first and second wheels to first and second desired torque values, respectively, and a difference between a tire tread wear of the first wheel and a tire tread wear of the second wheel exceeding a threshold, adjust the torque of the first electric machine to less than the first desired torque value and adjust the torque of the second electric machine to greater than the second desired torque value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
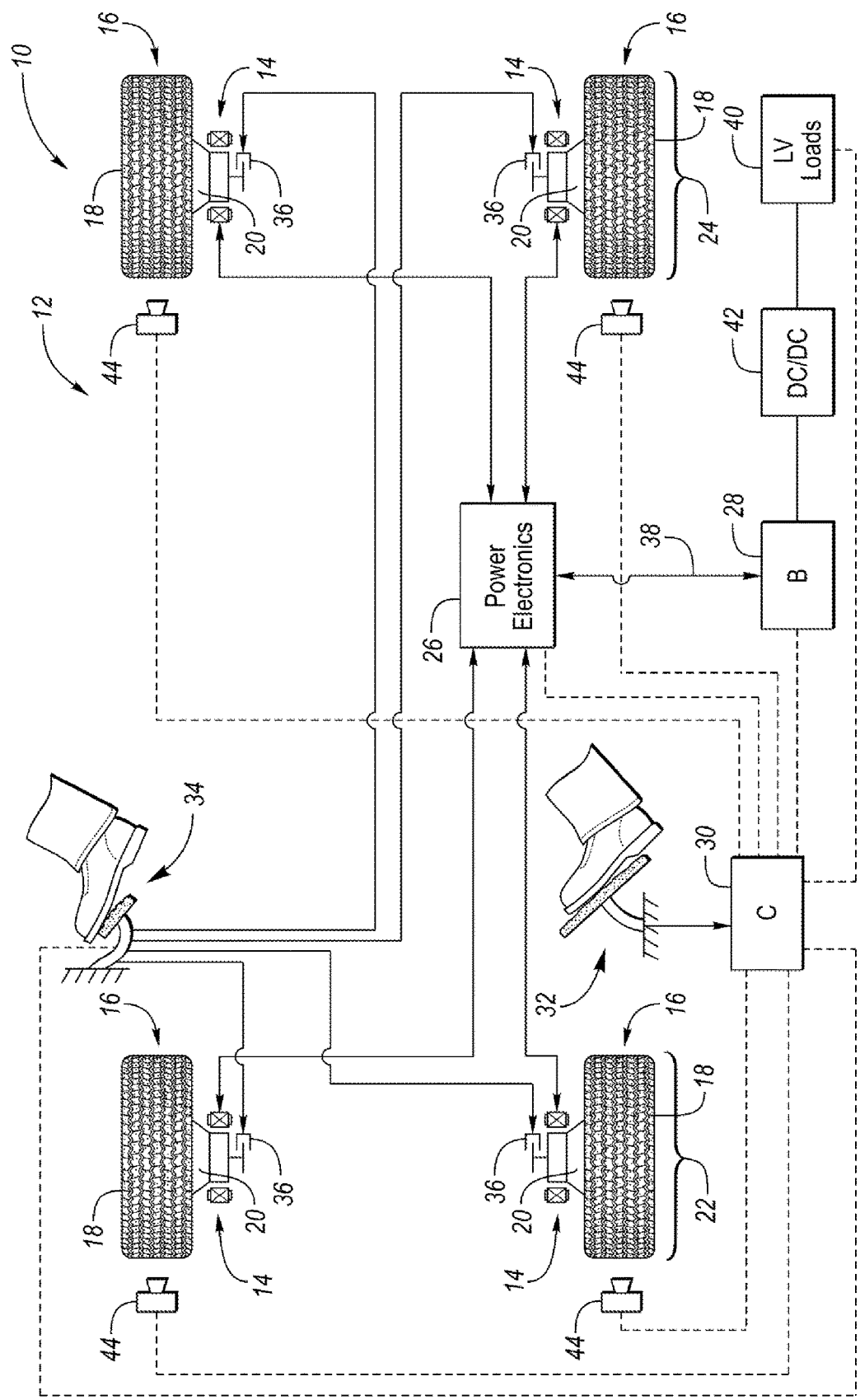
FIG. 1 is a schematic illustration of a representative powertrain of an electric vehicle.

Referring to FIG. 1, a schematic diagram of an electric vehicle 10 is illustrated. The vehicle 10 includes multiple electric motors that deliver power to separate drive wheels. The vehicle 10 includes a powertrain 12. The powertrain 12 includes a plurality of electric machines (or motor/generators) 14. Each electric machine 14 is configured to deliver power and torque to one of a plurality of drive wheels 16. Each drive wheel 16 may include tire 18. Each tire may have treads. Each drive wheel drive 16 and a corresponding electric machine 14 are secured to a wheel hub 20. A first pair of the drive wheels 16 may be connected to each other via a differential, shafts (e.g., half shafts), universal joints, etc. to form a first axle 22. A second pair of the drive wheels 16 may be connected to each other via a differential, shafts (e.g., half shafts), universal joints, etc. to form a second axle 24. The first axle 22 may be a front axle of the vehicle 10 while the second axle 24 may be a rear axle of the vehicle. In an embodiment that includes axles, each axle may have one or more electric machines that are configured to deliver power and torque to the wheels of the respective axle via any of the linking components (i.e., the differential, shafts, universal joints, etc.), as opposed to an electric machine at each wheel.

The electric machines 14 may act as drive sources to propel the vehicle 10. The electric machines 14 may each be implemented by any one of a plurality of types of electric machines. For example, the electric machines 14 may be permanent magnet synchronous motors. Power electronics 26 condition direct current (DC) power provided a traction battery 28 to the requirements of the electric machines 14, as will be described below. For example, the power electronics 26 may provide three phase alternating current (AC) to each of the electric machines 14.

The powertrain 12 further includes an associated controller 30 such as a powertrain control unit (PCU). While illustrated as one controller, the controller 30 may be part of a larger control system and may be controlled by various other controllers throughout the vehicle 10, such as a vehicle system controller (VSC). It should therefore be understood that the powertrain control unit 30 and one or more other controllers can collectively be referred to as a "controller" that controls various actuators in response to signals from various sensors to control functions such as operating the electric machines 14 to provide wheel torque or to charge battery 28 (e.g., via regenerative braking). Controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the engine or vehicle.

The controller 30 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 30 may communicate signals to and/or the electric machines 14, the battery 28, power electronics 26, etc. Although not explicitly illustrated, those of ordinary skill in the art will recognize various functions or components that may be controlled by controller 30 within each of the subsystems identified above. Representative examples of parameters, systems, and/or components that may be directly or indirectly actuated using control logic and/or algorithms executed by the controller 30 include battery charging or discharging, regenerative braking, electric machine operation, and the like. Sensors communicating input through the I/O interface may be used to indicate wheel speeds (WS1, WS2, WS3, WS4), vehicle speed (VSS), accelerator pedal position (PPS), ignition switch position (IGN), air temperature (TMP), battery temperature, voltage, current, or state of charge (SOC), for example.

In vehicles that include an internal combustion engine, representative examples of parameters, systems, and/or components that may be directly or indirectly actuated using control logic and/or algorithms executed by the controller 30 include the include fuel injection timing, rate, and duration, throttle valve position, spark plug ignition timing (for spark-ignition engines), intake/exhaust valve timing and duration, front-end accessory drive (FEAD) components such as an alternator, air conditioning compressor. Also, in vehicles that include an internal combustion engine, sensors communicating input through the I/O interface may be used to indicate to turbocharger boost pressure, crankshaft position (PIP), engine rotational speed (RPM), coolant temperature (ECT), intake manifold pressure (MAP), throttle valve position (TP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch status (TCC), or deceleration or shift mode (MDE) for example.

Control logic or functions performed by controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 32 is used by the driver of the vehicle to provide a demanded torque, power, or drive command to the powertrain 12 (or more specifically to the electric machines 14 or other powerplants) to propel the vehicle 10. In general, depressing and releasing the accelerator pedal 32 generates an accelerator pedal position signal that may be interpreted by the controller 30 as a demand for increased power or torque, or decreased power or torque, respectively. A brake pedal 34 is also used by the driver of the vehicle to provide a demanded braking torque to slow the vehicle. In general, depressing and releasing the brake pedal 34 generates a brake pedal position signal that may be interpreted by the controller 30 as a demand to decrease the vehicle speed. Based upon inputs from the accelerator pedal 32 and brake pedal 34, the controller 30 commands the torque and/or power to the electric machines 14 (and any other powerplant that may not be shown) and friction brakes 36.

The friction brakes 36 are configured to brake the drive wheels 16. The friction brakes 36 may be disk type friction brakes that include pads that engage a rotating disk or drum type friction brakes that include shoes that engage a rotating drum. The disk type or drum type friction brakes may be mechanical, pneumatically, hydraulically, or electrically operated, and may be activated by an actuator such as a hydraulic cylinder (e.g., a master cylinder), a pneumatic cylinder, electric motor, or electric solenoid.

The electric machines 14 may also be configured to brake the drive wheels 16 by operating in a "generator mode" that creates a resistance to the motion of the drive wheels 16. More specifically, the electric machines 14 may generate a magnetic or electromagnetic resistance when operating in the "generator mode" to brake the drive wheels 16. The electric machines 14 may each charge the battery 28 while braking the drive wheels 16, which is referred to as regenerative braking. In the event that the battery 28 is charged and braking is required, the electrical energy generated by braking may be diverted to a resistive element, such as a filament, that absorbs or converts the kinetic energy from braking into thermal energy or the friction brakes 36 may be utilized.

The traction battery 28 may transmit stored electrical energy through wiring 38 to the power electronics 26 that may include inverting circuitry. The inverting circuitry of the power electronics 26 converts DC voltage from the battery 28 into AC voltage to be used by the electric machines 14 to propel the vehicle 10. Additionally, the electric machines 14 may transmit AC voltage to the power electronics 26 that may also include rectifying circuitry. The rectifying circuitry of the power electronics 26 converts the AC voltage from the electric machines 14 into DC voltage, which is then used to charge the battery 28.

The battery 28 may also be configured to provide electrical power to one or more low voltage loads 40 (e.g., vehicle accessories) via a DC/DC converter 42. The low voltage loads 40 may include, but are not limited to, heating, ventilating, and air conditioning (HVAC) systems, power steering systems, electric heaters, sensors used for collision avoidance or parking (e.g., lidar or ultrasound sensors), sound systems, radios, entertainment systems, or any other system or device that is electrically operated.

The vehicle 10 may also include cameras 44 that are configured to measure the tread wear on the tires 18 of each drive wheel 16. The cameras 44 may be configured to communicate the tread wear back to the controller 30.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
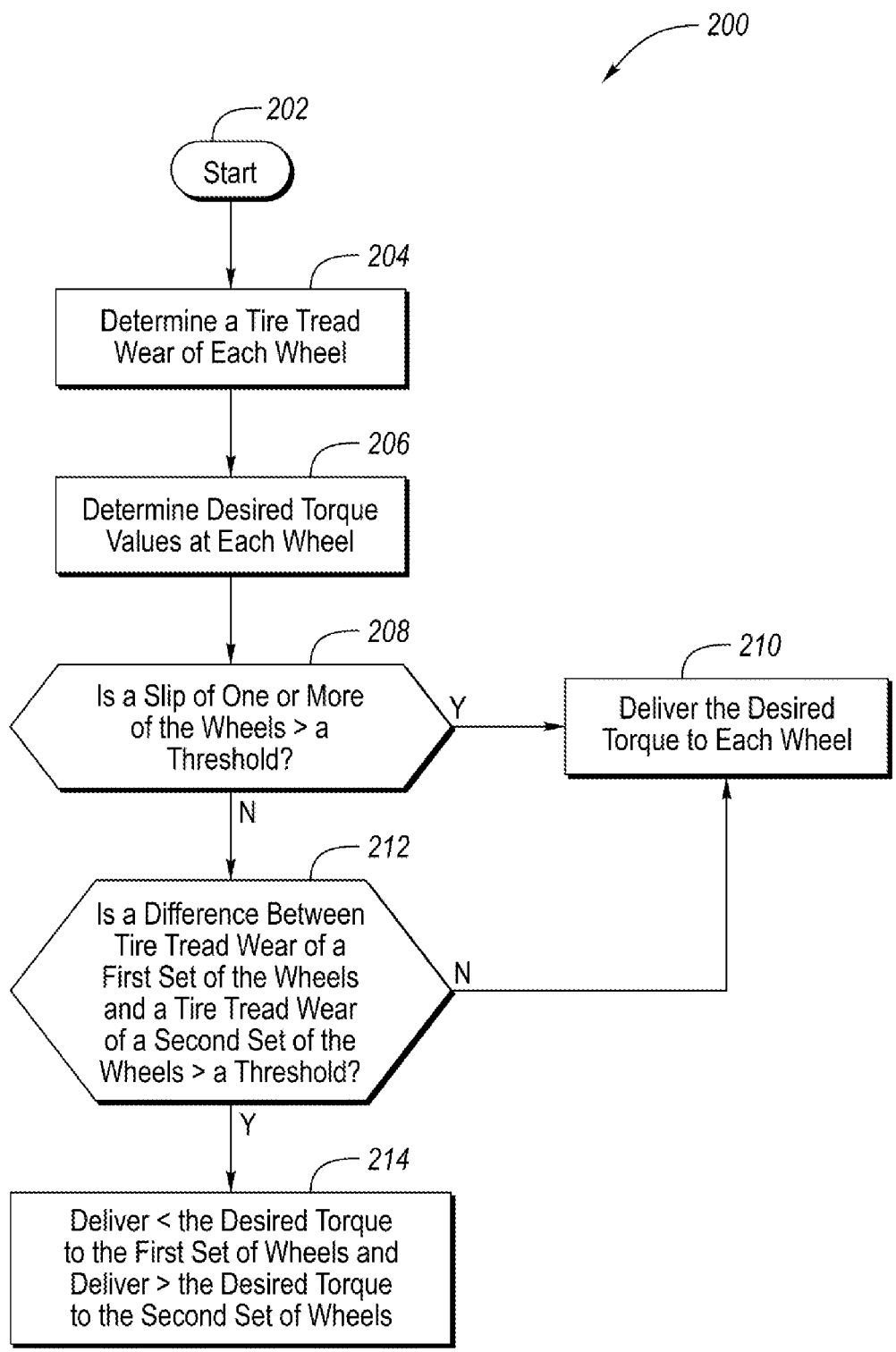
FIG. 2 is a method of controlling the torque delivered to each wheel of the vehicle.

Referring to FIG. 2, a method 200 of controlling the torque delivered to each wheel of the vehicle 10 is illustrated. The method 200 may be stored as control logic and/or an algorithm within the controller 30. The controller 30 may implement the method 200 by controlling the various components of the vehicle 10. The method 200 is initiated at start block 202. The method 200 may be initiated at start block 202 by turning a start key or ignition of the vehicle 10 to an "on" position.

The method 200 moves on to block 204 where the tire tread wear of the tires 18 on each wheel 16 is determined. The tire tread wear may refer to a current tread depth of the tire, a difference between an initial tread depth and the current tread depth of the tire, or any wear pattern of the tire (e.g., a disproportionate amount of wear over a first area of the tire relative to a second area of the tire). The tire tread wear may be based on manually scanned data that is input into the controller (i.e., scanned images from a scanning device, such as a scanner that measures relative positions on an object, that measure the tread wear), may be based camera images that are communicated to the controller 30, may be based on a summation of previous torque values commanded to each wheel over the course of vehicle operation to estimate the total work each wheel has performed (this may be referred to as a "torque counting" method), or may be determined via any other known method.

Next, the method 200 then moves on to block 206 where the controller 30 determines the desired torque values at each wheel of the vehicle 10. The desired torque values may be based on desired torques received from the accelerator pedal 32 to propel the vehicle 10 or may be based on desired torques received from the brake pedal 34 to brake the vehicle 10 via regenerative braking. The desired torque values may be different for each wheel on a single axle and may be different for wheels that are on different axles (e.g., the desired torque values may be different between a wheel on the front axle and a wheel on the rear axle).

Alternatively, it may be desirable to maintain a balanced torque within each wheel of a single axle. For Example, the desired torque values may include equal amounts of torque on each of the two wheels of the front axle and equal amounts of torque on each of the two wheels of the rear axle, while the torque values between the wheels on the front axle and the rear axle may be different. The desired torques at each wheel may correspond to the desired torques of the respective electric machines (e.g., electric machine 14) that are configured to deliver torque to each wheel or to each axle.

The method 200 then moves on to block 208 where it is determined if the amount of slip that one or more of the wheels is experiencing is greater than a threshold. If the slip that one or more of the wheels is experiencing is greater than a threshold, the method 200 moves on to block 210, where the desired torque values are delivered to each wheel. As previously stated, it should be understood that the desired torque values may be different for each wheel within a single axle, may be different for wheels that are on different axles, or may be different for wheels that are on different axles while the same for each wheel that is on the same axle, which may occur during either straight line movement of the vehicle or while the vehicle is turning.

Alternatively, at block 210 the amount of torque delivered to each wheel may be reduced proportionally relative to the desired torque values such that less than the desired torque values are delivered to each wheel while maintaining an equivalent torque distribution at each wheel. For example, if the desired torque values of the front wheels correspond to 70% of the total desired torque and the torque values on the rear wheels correspond to 30% of the total desired torque, the torque delivered to the wheels at block 210 may be less than the desired values while maintaining the 70% torque distribution on the front wheels and the 30% torque distribution on the rear wheels.

Returning to block 208, if the slip that one or more of the wheels is experiencing is not greater than the threshold, the method 200 moves on to block 212, where it is determined if a difference between a tire tread wear of a first of the wheels and a tire tread wear of a second of the wheels is greater than a threshold. Alternatively, at block 212 it may be determined if a difference between a tire tread wear one of the wheels of a first pair of wheels, which may be on a first axle, and a tire tread wear one of the wheels of a second pair of the wheels, which may be on a second, is greater than a threshold. If the difference between the tire tread of the first of the wheels (or one of the wheels of the first pair of wheels) and the second of the wheels (or one of the wheels of the second pair of wheels) is not greater than the threshold, the method 200 moves on to block 210, where the desired torque values are delivered to each wheel.

If the difference between the tire tread wear of the first of the wheels (or one of the wheels the first pair of wheels) and the tire tread wear of a second of the wheels (or one of the wheels the second pair of wheels) is greater than the threshold at block 212, the method 200 moves on to block 214. At block 214, assuming the tire tread wear of the first of the wheels (or one of the wheels the first pair of wheels) is greater than the tire tread wear of the second of the wheels (or one of the wheels the second pair of wheels), torque is delivered to the first of the wheels (or the first pair of wheels) at a value that is less than the desired torque at the first of the wheels (or the first pair of wheels) and torque is delivered to the second of the wheels (or the second pair of wheels) at a value that is greater than the desired torque at the second of the wheels (or the second pair of wheels). It should be understood that the torque delivered at block 214 may include delivering different torque values to wheels that are on the same axle, may include delivering different torque values to wheels that are on different axles, or may include delivering different torque values to wheels that are on different axles while delivering the same torque values to wheels that are on the same axle, which may occur during either straight line movement of the vehicle or while the vehicle is turning.

At block 214, if the tire tread wear of the second of the wheels was greater than the tire tread wear of the first of the wheels, the torque delivered to the second of the wheels would be less than the desired torque at the second of the wheels and the torque delivered to the first of the wheels would greater than the desired torque at the first of the wheels. It should also be understood that at block 214 that the torque being delivered to any number of wheels, may be delivered to the individual wheels at values that descend in value or in proportion relative to desired values as the tire tread wear increases.

Although it is described herein that adjusting the torque being delivered to each wheel corresponds to adjusting the torque of an electric machine associated with each wheel, it should be understood that any method of adjusting the torque at each wheel or axle known to a person skilled in the art should be construed as disclosed herein. For example, in hybrid vehicles that include electric machines and/or internal combustion engines, the torque outputs of the electric machines and/or internal combustion engines may be adjusted to adjust the torque at each wheel. Other examples may include inducing slip at one or more of the wheels to adjust the torque, including clutches at each wheel to adjust the torque output at each wheel, etc. The methods describe herein allow for an even distribution of tread wear on each wheel.

It should be understood that the flowchart in FIG. 2 is for illustrative purposes only and that the method 200 should not be construed as limited to the flowchart in FIG. 2. Some of the steps of the method 200 may be rearranged while others may be omitted entirely. It should be further understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a plurality of wheel hubs;
   a plurality of wheels, each wheel including a tire, and each wheel secured to one of the wheel hubs; and
   a plurality of electric machines, each electric machine secured to one of the wheel hubs, and each electric machine configured to transfer torque to one of the wheels; and
   a controller programmed to,
   receive inputs indicative of tire tread wear of each wheel,
   estimate the tire tread wear of each of the wheels based on a summation of previous torque values commanded to each of the wheels,
   in response to a command to adjust torques of each of the electric machines to corresponding desired torque values and a difference between a tire tread wear of a first of the wheels and a tire tread wear of a second of the wheels exceeding a threshold,
   adjust the torque of a first of the electric machines, which is configured to transfer torque to the first of the wheels, to less than the corresponding desired torque value being commanded to the first of the electric machines, and
   adjust the torque of a second of the electric machines, which is configured to transfer torque to the second of the wheels, to greater than the corresponding desired torque value being commanded to the second of the electric machines.

2. The vehicle of claim 1, wherein the controller is further programmed to, in response to the command to adjust the torques of each of the electric machines to the corresponding desired torque values and the difference between the tire tread wear of the first of the wheels and the tire tread wear of the second of the wheels being less than the threshold, adjust the torque of the first of the electric machines to the corresponding desired torque value being commanded to the first of the electric machines, and adjust the torque of the second of the electric machines to the corresponding desired torque value being commanded to the second of the electric machines.

3. The vehicle of claim 1, wherein the tire tread wear of each wheel is based on manually scanned data that is input into the controller.

4. The vehicle of claim 1 further comprising cameras disposed about each of the wheels, and wherein the tire tread wear of each wheel is based on images taken by the cameras and communicated to the controller.

5. The vehicle of claim 1, wherein the controller is further programmed to, in response to (i) the difference between the tire tread wear of the first of the wheels and the tire tread wear of the second of the wheels exceeding the threshold and (ii) a wheel slip of one or more of the plurality of wheels exceeding a second threshold, adjust the torque of the first of the electric machines to the corresponding desired torque value being commanded to the first of the electric machines, and adjust the torque of the second of the electric machines to the corresponding desired torque value being commanded to the second of the electric machines.

6. The vehicle of claim 1, wherein the controller is further programmed to adjust the torque of the first of the electric machines to less than the corresponding desired torque value and adjust the torque of the second of the electric machines to greater than the corresponding desired torque value in response to the difference between the tire tread wear of the first of the wheels and the tire tread wear of the second of the wheels exceeding the threshold only if a wheel slip of one or more of the plurality of wheels is less than a second threshold.

7. A vehicle comprising:
a first pair of wheels having a first pair of tires;
a second pair of wheels having a second pair of tires;
a first electric machine configured to transfer torque to at least one of the wheels of the first pair of wheels;
a second electric machine configured to transfer torque to at least one of the wheels of the second pair of wheels;
cameras disposed about each of the wheels; and
a controller programmed to,
receive inputs indicative of tire tread wear of the first and second pairs of wheels,
in response to a command to adjust torques of the first and second electric machines to first and second desired torque values, respectively, and a difference between a tire tread wear of one of the wheels of the first pair of wheels and a tire tread wear of one of the wheels of the second pair of the wheels being less than a threshold, adjust the torque of the first electric machine to the first desired torque value and adjust the torque of the second electric machine to the second desired torque value, and
in response to the command to adjust the torques of the first and second electric machines to the first and second desired torque values, respectively, and the difference between the tire tread wear of one of the wheels of the first pair of wheels and the tire tread wear of one of the wheels of the second pair of the wheels exceeding the threshold, adjust the torque of the first electric machine to less than the first desired torque value and adjust the torque of the second electric machine to greater than the second desired torque value, wherein the tire tread wear of each wheel is based on images taken by the cameras and communicated to the controller.

8. The vehicle of claim 7, wherein the tire tread wear of each wheel is based on manually scanned data that is input into the controller.

9. The vehicle of claim 7, wherein the controller is further programmed to estimate the tire tread wear of each of the wheels based on a summation of previous torque values commanded to each of the wheels.

10. The vehicle of claim 7, wherein the controller is further programmed to, in response to (i) the difference between the tire tread wear of one of the wheels of the first pair of wheels and the tire tread wear of one of the wheels of the second pair of the wheels exceeding the threshold and (ii) a wheel slip of one or more of the wheels exceeding a second threshold, adjust the torque of the first electric machine to the first desired torque value and adjust the torque of the second electric machine to the second desired torque value.

11. The vehicle of claim 7, wherein the controller is further programmed to adjust the torque of the first electric machine to less than the first desired torque value and adjust the torque of the second electric machine to greater than the second desired torque value in response to the difference between the tire tread wear of one of the wheels of the first pair of wheels and the tire tread wear of one of the wheels of the second pair of the wheels exceeding the threshold only if a wheel slip of one or more of the wheels is less than a second threshold.

12. A vehicle comprising:
first and second wheels having first and second tires, respectively; and
a controller programmed to,
receive inputs indicative of tire tread wear of the first and second wheels,
in response to a command to adjust torques of the first and second wheels to first and second desired torque values, respectively, and a difference between a tire tread wear of the first wheel and a tire tread wear of the second wheel exceeding a threshold, adjust the torque of the first electric machine to less than the first desired torque value and adjust the torque of the second electric machine to greater than the second desired torque value, only if a wheel slip of one or more of the first and second wheels is less than a second threshold.

13. The vehicle of claim 12, wherein the controller is further programmed to, in response to the command to adjust torques of the first and second wheels to first and second desired torque values, respectively, and the difference between the tire tread wear of the first wheel and the tire tread wear of the second wheel being less than the threshold, adjust the torque of the first electric machine to the first desired torque value and adjust the torque of the second electric machine to the second desired torque value.

14. The vehicle of claim 12, wherein the tire tread wear of each wheel is based on manually scanned data that is input into the controller.

15. The vehicle of claim 12 further comprising cameras disposed about each of the first and second wheels, and wherein the tire tread wear of each wheel is based on images taken by the cameras and communicated to the controller.

16. The vehicle of claim 12, wherein the controller is further programmed to estimate the tire tread wear of the first and second wheels based on a summation of previous torque values commanded to the first and second wheels, respectively.

17. The vehicle of claim 12, wherein the controller is further programmed to, in response to (i) the difference between the tire tread wear of the first wheel and the tire tread wear of the second wheel exceeding the threshold and (ii) a wheel slip of one or more of the first and second wheels exceeding a second threshold, adjust the torque of the first electric machine to the first desired torque value and adjust the torque of the second electric machine to the second desired torque value.

* * * * *